3,630,955
GRAFT POLYMERIZATION AS A CAPSULE WALL
TREATING PROCESS
Donald Day Emrick, Kettering, Ohio, assignor to The
National Cash Register Company, Dayton, Ohio
No Drawing. Filed Jan. 29, 1968, Ser. No. 701,126
Int. Cl. B01j 13/02; B44d 1/02, 1/44
U.S. Cl. 252—316                                                    9 Claims

ABSTRACT OF THE DISCLOSURE

A process is provided for treating, en masse, existing capsule walls of hydrophilic polymeric material, in a liquid manufacturing vehicle, to seal the capsule walls against loss of fluid materials through permeation pathways. The process includes reacting material of the capsule walls with certain transition metals to provide nucleation sites unless such sites are already present and then initiating a free-radical-generated polymerization reaction wherein polymeric material is created interstitially or internally within the wall material during which it becomes grafted onto molecular units of the capsule wall material. Capsules resulting from practice of this invention have walls which exhibit greatly decreased permeation of fluids when compared with untreated capsule walls of like material. Examples of materials to be used for the graft-polymerization of free-radical-generated polymeric material include acrylonitrile, methacrylonitrile, fumaronitrile, and itacononitrile.

BACKGROUND OF THE INVENTION

Field of the invention

This invention pertains to a process for treating, en masse, the walls of existing capsules in a liquid medium containing monomeric material to seal capsule walls against permeation of fluid materials. It more specifically relates to such a process wherein material of the existing capsule walls is hydrophilic first polymeric material which has been reacted with certain transition metal catalysts in capsule wall material permeation pathways to provide nucleation sites for a graft polymerization treatment and wherein the treatment comprises in-situ formation, interstitially within the "ways" of the initial capsule wall material and at the nucleation sites, of free-radical-generated second polymeric material.

Capsules resulting from the treatment of this invention have walls comprising an intimately mixed composite of at least two kinds of polymeric material with at least two of the kinds of polymeric materials chemically joined (grafted) at the transition-metal-nucleation sites. The new material, thought to be made by joining the original wall polymer to the monomer units, will be regarded by some schools of thought to be a new polymer species. For the purpose of this disclosure, the new product of jointure will be spoken of as if a new polymer was joined to the original capsule wall polymer. The free-radical graft polymerization reaction is performed in a liquid vehicle in which the capsules to be treated are dispersed with the monomeric material. The graft polymerization reaction preferentially occurs at nucleation sites provided by transition metals complexed or preferentially sorbed within or on the initial capsule wall material and formation of the polymeric material is thereby concentrated and localized within the existing capsule walls in intimate association with the capsule wall material. An important aspect of the present invention is believed to reside in the discovery that the free-radical-generated polymeric material can be concentrated within the material of capsule walls by use of certain transition metal catalysts which have been complexed to the capsule wall material, thereby catalyzing formation of free-radical-generated polymeric material substantially within capsule wall material rather than evenly distributed throughout the vehicle in which the capsule wall material is dispersed.

Description of the prior art

This invention pertains to a treatment for the material of existing capsule walls. Moreover, it pertains to such a treatment wherein graft polymerization or locally catalyzed polymerization of free-radical-generating monomers is utilized. The method by which the capsule walls are originally produced or provided forms no part of this invention.

Free-radical-generating, monomeric materials polymerized in combination with other polymeric materials are well known. Several workers in the prior art have taught techniques for graft polymerization of acrylic or vinyl monomers onto polymeric materials such as gelatin or poly(vinyl alcohol) but such grafting has usually been accomplished from a solution of the polymeric material with the aim of producing an emulsion or solution of the grafted polymeric material for use in film or fiber manufacture. Moreover, the above-mentioned prior art has not utilized transition metal ions to promote the grafting in localized areas in a preformed structure. Examples of such prior art of graft polymerization include: U.S. Pat. 2,956,884 issued Oct. 18, 1960, on the application of John R. Caldwell; U.S. Pat. 2,794,787 issued June 4, 1957, on the application of Harry W. Coover, Jr.; and British Pat. 742,900 published Jan. 4, 1956, on the declaration of Imperial Chemical Industries Limited.

In Part A–1, volume 4, pages 1031–1043 (1966) of the Journal of Polymer Science, Zoila Reyes et al. reported graft polymerization of free-radical-generating monomers wherein the monomers were grafted onto particles of wheat starch dispersed in an aqueous solution containing strongly oxidizing ceric ions. The ceric ions were reported to have formed a complex with the starch particles although there was no indication that the interior of the starch particles were so-complexed or that the grafted polymeric material was present internally within the starch particles. The ungrafted capsule wall material of the subject invention is manufactured and is present as a phase separated from aqueous solution and maintained as capsule wall material by a delicate balance of equilibrium forces, while the starch particles represent a substantially homogeneous, naturally occurring, material stable in aqueous dispersion despite minor alterations in conditions.

Although not prior art, U.S. patent application Ser. No. 701,124, filed Jan. 29, 1968, on the same date herewith in the names of Robert G. Bayless and Donald D. Emrick, and assigned to the assignee herein, teaches a method for providing polymeric material interstitially or internally within the macromolecular structure of liquid-permeated, existing capsule walls by use of a polycondensation polymerization reaction. The interstitial or internal polymeric material of that Bayless and Emrick patent application is formed by reactive contact of an aldehydic reactant material with a polyhydroxy aromatic reactant material complexed within the existing capsule walls, both of which reactant materials are infused into the swollen capsule wall material. The resulting interstitial polymeric material is believed to be intertwined among molecular units of the preformed capsule wall and to be, thereby physically held to form part of a close-knit capsule wall structure. Emrick of the above-mentioned Bayless and Emrick patent application is the same inventor as the Emrick of this patent application.

SUMMARY OF THE INVENTION

The problem of treating capsule walls to guard against loss of contents by diffusion and permeation through the capsule walls is a problem of longstanding. The novel process of this invention represents a distinct advance over the prior encapsulating art in several respects. It is believed that the novel process provides a capsule wall of decreased permeability without resort to a laminate of concentric capsule wall layers. It is believed that the novel process provides a highly impermeable capsule wall having less thickness than would be required for a laminate capsule wall having the same high degree of impermeability. The novel process results in capsule walls which are hydrophobic, insoluble, and substantially unswellable in liquids which either dissolve or swell the capsule wall material before treatment by the process of this invention. The novel process greatly simplifies the, heretofore required, rather complex and expensive, final capsule manufacturing steps—those steps of isolating the capsules from a manufacturing vehicle and drying the capsule walls. The novel process results in a capsule wall which is an apparently molecularly interspersed composite of polymeric material, at least part of which is produced, in-situ, in the pre-existing capsule wall material by a free-radical polymerization reaction and is combined with or grafted onto the material of the existing hydrophilic polymeric capsule wall.

An object of this invention is to provide a process for treating existing, solvent-swollen capsule walls of hydrophilic polymeric material to make it hydrophobic wherein the resultant, hydrophobic capsule walls show increased resistance to fluid permeation. A further object of this invention is to provide such a process for capsule wall treatment wherein said treatment comprises the step of causing a free-radical-type of polymerization reaction to occur within the material of existing capsule walls. The reaction occurs among molecules of monomeric material supplied at nucleation (grafting) sites of transition metal ions in the capsule wall material. A further object of this invention is to provide a method for concentrating or localizing the polymerization reaction product of of the treatment of this invention within the structure of an existing solvent-swollen capsule wall by reacting the hydrophilic polymeric material in said wall with transition metal ions—the sites of such reaction providing sites for grafting and for subsequent nucleated polymerization.

The observation that in-situ free-radical polymerization can be performed in concentrated or localized volumes within each of a plurality of matrices of swollen polymeric material, which matrices are dispersed in a liquid vehicle, represents a foundation on which the present invention is believed to rest. It has been found that when certain transition metal ions or atoms are complexed to the polymeric matrix material, the product of free-radical polymerization which is subsequently performed will be concentrated within the polymeric matrix material and intimately associated therewith. For the purposes of this invention, the matrices are represented by solvent-swollen capsule walls of hydrophilic polymeric material. The process for performing the above-described free-radical addition polymerization and the capsule product of such a process are the features of this invention which are considered to be patentable.

The novel process of this invention, stated broadly, includes the steps of: (a) providing, for treatment in a liquid vehicle, capsules whose gelled or solid, solvent-swollen, walls comprise hydrophilic polymeric material which has been reacted or complexed with certain transition metal ions which ions serve as graft polymerization sites; (b) infusing into the walls of the so-provided capsules, by permeation or diffusion through the liquid which swells the capsule walls, free-radical-generating, polymerizable, unsaturated monomeric material necessary to the desired graft polymerization reaction and; (c) polymerizing the monomeric material to create a continuous, solid, complement of polymeric material within the molecular interstices of the existing capsule wall to be treated.

The free-radical generated, nucleated- or graft-polymerization of this invention is believed to rely on presence, in the capsule wall material, of transition metals as catalysts. While it is possible that the graft polymerization be practiced, in some cases, without addition of transition metal catalysts, it is believed that the degree of success achieved by such practice without added catalyst is a measure of the presence of trace transition metal "impurities" in the existing capsule wall.

With the foregoing discussion and objects of the invention in mind, the invention will now be explained in detail, from which detailed explanation and the appended claims, further objects and features of the invention will become apparent to those skilled in the art.

The process of this invention is intended to be practiced on existing, hydrophilic polymeric capsule wall material which is in a solvent-swollen state—the solvent usually being water but sometimes being an organic solvent. Material contained by the capsule walls, i.e., the capsular internal phase or core material, is relatively unimportant to the practice of this invention and can be any material capable of being encapsulated by commonly known techniques such as those described in U.S. Pat. Nos. 2,800,457 and 2,800,458, issued July 23, 1957 in the names of Barret Green and Lowell Schleicher, and Barret Green, respectively, or U.S. Pat. No. 3,190,837, issued June 22, 1965 in the name of Carl Brynko and Joseph Scarpelli—all assigned to the assignee herein. A few of the materials which can be utilized as capsule internal phases include, among a multitude of others: water insoluble or substantially water insoluble liquids, such as olive oil, fish oils, vegetable oils, sperm oil, mineral oil, xylene, toluene, benzene, kerosene, chlorinated biphenyl, and methyl salicylate; substantially water-insoluble metallic oxides and salts; fibrous materials, such as cellulose or asbestos; substantially water insoluble synthetic polymeric materials; minerals; pigments; glasses; elemental materials, including solids, liquids and gases; flavors; fragrances; reactants; biocidal compositions; physiological compositions; fertilizer compositions; and the like. In short, the core materials which can be contained in capsules to be treated can differ not only among themselves in their physical state, which can be solid, liquid, gas, or combinations thereof, but can differ in their chemical composition and intended use.

The present invention utilizes polymerization of free-radical generating, polymerizable, monomeric materials from a liquid manufacturing vehicle, which manufacturing vehicle is preferably aqueous or aqueous-alcoholic in character. The free-radical addition polymerization is caused to occur on the molecular units of existing capsule wall material, thereby providing grafted or nucleated polymeric material throughout the structure of the preformed capsule wall. The free-radical addition polymerization product is substantially insoluble in the manufacturing vehicle and as a film exhibits a low degree of permeability to liquids, particularly when it is grafted to the molecular units of the existing capsule wall material. The monomeric, free-radical, polymerizable materials which are preferable are those which produce a polymeric material substantially unaffected by "oily" organic solvents or water. Suitable free-radical polymerizable olefin-, or acrylate-, or vinyl-type monomer materials eligible for practice of this invention include: acrylonitrile; methacrylonitrile; fumaronitrile; and itacononitrile. Of course, combinations of two or more of the eligible monomer materials can be utilized to produce co-polymeric materials.

A necessary ingredient for practice of the present invention is transition metal salts naturally present or supplied with which a reaction is conducted using the existing capsule wall material prior to a graft polymerization. Graft polymerization or nucleated polymerization occurs at the transition metal-capsule wall material reactions sites. Suitable transition metal compounds which are not strong oxidizing agents for organic polymers and can be used to produce the reaction include water soluble compounds of iron, cobalt, nickel, copper, chromium (III), manganese, uranium, and vanadium (III or IV). It is believed that such transition metals catalyze the free-radical polymerization of this invention in conjunction with a suitable free-radical initiator to be specified. Before the monomer grafting or nucleated polymerization step and before the transition metal complexing step have been performed, it is preferable to remove transition metal ions that are not sorbed on the capsule wall material from the system to minimize possible generation of extraneous, non-localized, polymeric material in the manufacturing vehicle during the ensuing polymerization step of the process.

The polymerization is initiated by presence, in the manufacturing vehicle, of an initiator for the reaction. Such an initiator is usually required or desired in generating free radicals. Suitable free radical initiators for use in the present invention include: oxygen, hydrogen peroxide, alkyl hydroperoxides, aryl alkyl hydroperoxides, organic peracids, water-soluble inorganic-persulfates, peroxysulfates, alkyl peroxides, aliphatic or aromatic acyl peroxides, azo compounds, or the like.

The free-radical grafting polymerization reaction of this invention can be promoted or controlled by such factors as: (a) adjustment of the pH of the vehicle, (b) salt concentration or ionic strength or dielectric qualities of the vehicle, (c) concentrations of the reactive components and initiators in the vehicle, (d) relative concentrations of the various reactive components and initiators, (e) temperature of the vehicle and (f) duration allowed for the polymerization reaction to occur. Of course, the particular kind of reactive components and initiators used has an effect on the quality of treatment product and rate of treatment reaction.

Materials from which the existing capsule walls can be made can be any polymeric materials which are capable of reacting or complexing with the transition metal ions to provide sites for graft polymerization and any other materials which can be used in combination with said materials capable of reacting or complexing. Examples of such materials include: unmodified acid- or alkali-precursor gelatins, modified gelatins, such as succinylated gelatin, gum arabic, carrageenan, hydrolyzed poly(methylvinylether-co-maleic anhydride), hydrolyzed poly(ethylene-co-maleic anhydride), hydrolyzed poly(styrene-co-maleic anhydride), poly(vinyl alcohol), poly(vinyl pyrrolidone), poly(acrylic acid) and its salts, poly(methacrylic acid) and its salts, melamine/formaldehyde resin, or the like. As will be demonstrated in the "Description of Preferred Embodiments," additional examples of capsule wall materials for treatment by this invention are taught in U.S. patent applications Ser. Nos. 701,129, 701,127, 701,128 all filed on the same date herewith in the names of Donald D. Emrick, Robert G. Bayless and Donald D. Emrick, and Robert G. Bayless, respectively, and assigned to the assignee herein. The inventor, Emrick, named in the above patent applications, is the same inventor as the Emrick herein.

Capsules made by the process of this invention are not substantially changed in shape and can have diameters from about one micron to several thousand microns. The size of capsules made by this invention is, in fact, limited only by the size of capsules which can be supplied, by other methods, for treatment by this invention. This invention may be practiced with individual capsules with each entity having, as an internal phase, one particle of capsule core material or with aggregates of individual capsules with each aggregate entity having several particles of capsule core material. Capsule aggregates can be made in sizes from a few microns in diameter to several thousand microns in diameter depending upon the size and number of individual capsule core particles included in each aggregate. It should be understood that the treated capsules need not have dried walls or even be separated from a liquid vehicle prior to their use. If it is desired or required for some intended purpose, the capsule product of this invention can be supplied as a slurry of capsules in a liquid carrier, either the manufacturing vehicle or not, as for use in a paper-coating composition, a paint, an insecticide composition, or the like—such uses being well-known and obvious to persons skilled in the pertinent arts.

DESCRIPTION OF PREFERRED EMBODIMENTS

In the following examples, 1–5 inclusive, capsules with gelatin-containing preformed capsule walls were utilized. For the sake of completeness, the method which was used to prepare the capsule walls will be described although such method is not considered to be a part of this invention.

Preparation A

Into a vessel having a capacity of approximately 2000 milliliters and equipped for heating and agitation were placed 800 milliliters of warmed (about 55 degrees centigrade) water, 180 milliliters of 11 percent, by weight, aqueous warmed gum arabic solution, 180 milliliters of 11 percent, by weight, aqueous warmed gelatin solution—the gelatin being characterized by having an isoelectric point of 8 to 9 and by having a Bloom strength of 285 to 305 grams, 80 milliliters of 2 percent, by weight, aqueous warmed solution of a mixture of sodium-hydroxide-neutralized copolymers of ethylene and maleic anhydride, a one-to-one, by weight, ratio of "EMA–21" and "EMA–31," which are poly(ethylene-co-maleic anhydride) materials having molecular weights of about 6000 and 60,000 to 70,000, respectively, as sold by Monsanto Chemical Company, St. Louis, Mo., United States of America, and 250 milliliters of toluene. The toluene served as the capsule internal phase for this example. Agitation was adjusted to yield a dispersion of capsule internal phase particles having diameters of about 1000 microns and the pH of the agitating system was adjusted to 6.5 in order to cause optimum emergence of a capsule wall-forming separated-liquid phase. The agitating system was permitted to cool to a temperature of about 25 degrees centigrade, during which the liquid capsule wall-forming phase finished wrapping the capsule internal phase particles and gelled. The system, now including capsules, was chilled to a temperature of about 10 degrees centigrade and the pH was adjusted to about 4.5 using 14 percent, by weight, aqueous acetic acid solution. Ten milliliters of 25 percent, by weight, aqueous pentanedial (commonly named glutaraldehyde) solution were added to the system in order to chemically cross-link the capsule wall material. The system was agitated overnight (about 14 to 16 hours) during which time the system temperature was permitted to increase to about 25 degrees centigrade. The capsules, now having walls of chemically cross-linked material, were separated from the liquid in the system by centrifuging and the capsules were washed with water by immersion. These moist swollen-walled capsules were utilized in Examples 1 through 4.

Portions of the above capsule preparation were treated using several transition metal solutions and the so-treated capsules (subsequently water washed to remove extraneous or unutilized transition metal solution) were then subjected to the graft polymerization reaction of this invention. The transition metal- and graft-polymerization-treated and dried capsules were tested for loss of toluene, which was the capsule internal phase, by permeation through the wall under two different environmental conditions and the results were compared to a sample of capsules taken from the same capsule preparation but not treated. The following four examples describe the various transition metals and treatments used in preparation of capsules treated by the process of this invention for the loss-by-permeation tests and, the table following the examples displays results of the tests.

Example 1

Twenty-eight grams of the moist, Preparation A, capsules were dispersed in a vessel with 150 milliliters of a 0.5 percent, by weight, aqueous solution of cupric acetate monohydrate having an adjusted pH of 4.5 and the dispersion was agitated for 16 hours at a temperature of 25 degrees centigrade to permit a complexing reaction between the capsule wall material and the cupric ions. The complexed capsules were washed several times by immersion in distilled water and were then dried using granulated cork in a stream of moving air at room temperature, after which the capsules were separated by a sieving step.

Ten grams of the resultant, dried, capsules which were about 1000 microns in diameter, were dispersed in a solution fo 180 milliliters of water, 13 milliliters of inhibitor-free acrylonitrile and 4 milliliters of 8.5 percent, by weight, aqueous ammonium persulfate solution, in a nitrogen atmosphere.

Agitation of the system, maintained at a temperature of about 25 degrees centigrade, was continued for about 72 hours and then the capsules were separated from the liquid vehicle by filtering and were spread on an absorbent surface to dry. Results of a test which was conducted using the capsules of this example are presented in the table following Example 4.

Example 2

The procedure of Example 1 was repeated allowing only 21 hours of agitation at a temperature of about 25 degrees centigrade for the grafting to occur.

Example 3

Twenty-eight grams of the moist, Preparation A, capsules were dispersed in a vessel with 150 milliliters of a 0.5 percent, by weight, aqueous solution of chromic acetate monohydrate at an adjusted pH of 4.5, and the dispersion was agitated for 16 hours at a temperature of 25 degrees centigrade to permit a complexing reaction between the capsule wall material and the chromium ions. The complexed capsules were washed several times by immersion in distilled water and were then dried using granulated cork in a moving stream of air and then were separated from the cork by a sieving operation.

Ten grams of the resultant, dried, capsules which were about 1000 microns in diameter, were dispersed in a solution of 180 milliliters of water, 13 milliliters of inhibitor-free acrylonitrile and 4 milliliters of 8.5 percent, by weight, aqueous ammonium persulfate, solution, in a nitrogen atmosphere. Agitation of the system, maintained at a temperature of about 25 degrees centigrade, was continued for about 24 hours and then the capsules were separated from the liquid vehicle by filtering and were spread on an absorbent surface to dry. Results of a test which was conducted using the capsules of this example are presented in the table following Example 4.

Example 4

Example 3 was repeated identically to serve as a check on reproducibility of experimental results.

| Example | Type of complexing transition metal | 160 hours at 85% relative humidity, 25° C. | 30 minutes in boiling water |
|---|---|---|---|
| | Control (no metal and no grafting) | 20.0 | 70.8 |
| 1 | Cupric acetate | 0.7 | 18.4 |
| 2 | do | 3.9 | 18.4 |
| 3 | do | 5.2 | 31.6 |
| 4 | do | 3.3 | 42.4 |

Percent wt., material lost from capsules after—

Graft polymerization treatments similar to those described above utilizing acrylonitrile and cupric and chromic salts were repeated on capsules which contained materials such as tetrachlorotetrafluoropropane, trichlorobiphenyl, and a substantially nonaromatic hydrocarbon distillate. The capsule product appeared, in every case, to be of quality comparable to that of the treated capsules of the preceding examples.

Example 5

This example utilized capsules prepared identically with the procedure described as Preparation A, above, and the capsules were complexed using cupric acetate as was described in Example 1, above. This example, however, utilized methacrylonitrile instead of acrylonitrile as the monomeric polymerizing material.

Thirty grams of the copper-complexed, toluene-containing, capsules were dispersed in 360 milliliters of distilled water, 26 milliliters of inhibitor-free methacrylonitrile and 9.0 milliliters of 8.5 percent, by weight, ammonium persulfate solution, under a nitrogen atmosphere, the system being maintained at about 25 degrees centigrade. Agitation of the system was continued for about 92 hours to permit completion of the polymerization reaction. The capsules were then washed several times by immersion in water and were separated from the water by filtering. These capsules were dried by being placed on a forced air blower at a temperature of about 25 degrees centigrade for about two hours. The resulting, dried, capsules had opaque walls which were brittle as indicated by a "crunchy" sound when the capsules were ruptured. The treated capsule walls of this example, and the treated capsule walls of the preceding four examples, showed little or no tendency to swell when immersed in water.

Preparation B

A dispersion was prepared by adding, with agitation, 230 milliliters of a two-to-one, by weight, ratio of a solution of trichlorobiphenyl and a water-insoluble hydrocarbon oil to a warm (55 degrees centigrade) solution of 20 grams of gelatin (of the grade previously designated in Preparation A) in about 350 milliliters of water. Agitation of the dispersion was adjusted to yield particles of the trichlorobiphenyl/oil solution (the capsule internal phase for this example) having diameters of about 100 to 500 microns and the pH of the dispersion was adjusted to about 9.0. To the agitating dispersion were slowly added, in order: 180 milliliters of 11 percent, by weight, warmed aqueous gum arabic solution; 25 milliliters of 5 percent, by weight, warmed sodium-hydroxide-neutralized aqueous solution (pH 8.0) of a copolymer of methylvinylether and maleic anhydride—the copolymer being characterized by having a Brookfield viscosity of about 45 to about 55 centipoises in 5 percent, by weight, aqueous solution at a temperature of 20 degrees centigrade, a softening point temperature of 200 to 225 degrees centigrade and a specific gravity of 1.37 (such as the material designated as "Gantrez AN-139" and sold by General Aniline and Film Corp., New York, New York, United States of America); and 800 milliliters of warmed water. After the above additions, the pH was reduced to 6.2 in order to cause optimum emergence of a liquid capsule wall-forming phase and, with continued agitation over a duration of about three hours, the temperature of the dispersion was permitted to decrease to about 25 degrees centigrade. The dispersion, now containing capsules with gelled walls, was chilled to a temperature of about 0 to 5 degrees centigrade and a chilled mixture of solutions was added to the dispersion which mixture consisted of 375 milliliters of 2 percent, by weight, aqueous cupric acetate monohydrate solution and 25 milliliters of 25 percent, by weight, aqueous pentanedial (commonly named glutaraldehyde) solution. The two solutions were added to complex and cross-link the capsule wall material. The pH of the chilled system was adjusted to about 4.9 and agitation was maintained for about 17 hours during which time the temperature of the system was permitted to increase to about 25 degrees centigrade. The capsules, having copper-complexed, chemically cross-linked capsule walls were washed several times with water by filtration and immersion steps and the capsules were dried by placing them in a moving stream of air at a temperature of 25 degrees centigrade.

Example 6

To again demonstrate the treatment provided by the present invention, 20 grams of the above-prepared, copper-complexed, capsules from Preparation B were dispersed, at a temperature of about 25 degrees centigrade, in a system consisting of: 180 milliliters of water; 13 milliliters of inhibitor-free acrylonitrile; and 11.5 milliliters of 8.5 percent, by weight, aqueous ammonium persulfate solution. The dispersion was agitated, under an atmosphere of nitrogen, for about 24 hours to permit completion of the polymerization reaction within the capsule wall material. The capsules were dried on a forced air blower at a temperature of about 25 degrees centigrade after having been washed several times by water. The capsules were individual entities having walls which exhibited no tendency to swell on immersion in water.

Preparation C

Into a vessel having a capacity of about 1500 milliliters and equipped for agitation and heating were placed 500 milliliters of 8 percent, by weight, aqueous solution of succinylated gelatin (such as the gelatin product designated "Type 2001" and sold by Kind and Knox Gelatin Company, Camden, N.J., United States of America) and approximately 200 milliliters of 20 percent, by weight, aqueous sodium sulfate (anhydrous basis) solution. The system was warmed to a temperature of about 40 degrees centigrade and the pH was adjusted to 4.3 with aqueous acetic acid solution to provide an optimum degree of liquid-liquid phase separation. Two hundred milliliters of toluene (the capsule internal phase material for this example) were added to the system and the agitation was adjusted to yield particles of toluene 500 to 1000 microns in diameter. The agitating system was cooled to a temperature of about 25 degrees centigrade to provide swollen-walled capsules containing toluene—most of the liquid-liquid phase-separated capsule wall material being deposited, in significant amounts, on the toluene particles when the temperature of the system was about 33 degrees centigrade. The dispersion of capsules was then chilled to a temperature of 5 to 10 degrees centigrade and combined, in a larger vessel, with 800 milliliters of 20 percent, by weight, aqueous, sodium sulfate solution and 500 milliliters of 1 percent, by weight, aqueous chilled chromic sulfate hydrate; and, after a short duration of agitation, the capsules in the dispersion were permitted to steep for about 16 hours at a temperature of about 25 degrees centigrade to permit complete complexing of the chromium with the succinylated gelatin capsule wall material. After washing the capsules several times in chilled water, they were dried by being tumbled in air in the presence of several equivalent volumes of granulated cork. When the capsules were dry they were easily separated from the cork particles by sieving.

Example 7

This example utilized capsules manufactured in Preparation C which capsules had capsule walls of succinylated gelatin. Sixteen grams of dried capsules were dispersed in a chilled liquid system of 180 milliliters of 12 percent, by weight, aqueous sodium sulfate (anhydrous basis) solution, 40 milliliters of purified toluene, 13 milliliters of inhibitor-free acrylonitrile, and 4 milliliters of 8.5 percent, by weight, aqueous amonium persulfate solution all contained in a closed system—care being taken that all air was excluded from the system by use of a nitrogen atmosphere. Agitation was conducted for about 2 hours with the system temperature at about 0 to 5 degrees centigrade and then the system was agitated for about 46 hours during which time the system temperature was permitted to rise to about 25 degrees centigrade. After the period of agitation, the treated capsules, now with polymeric material grafted within the initially formed, copper-complexed, capsule wall material, were washed several times by water and were dried by placing the capsules in a stream of air at a temperature of about 25 degrees centigrade. The dried, treated, capsules exhibited no tendency to reswell on immersion in water and the walls were rigid and brittle.

Example 8

This example also utilized capsules manufactured in Preparation C, above.

This example was identical with Example 7, above, with the exception that 13 milliliters of inhibitor-free methacrylonitrile were substituted for the acrylonitrile of Example 7. The treated-capsule product of this example had capsule walls which were slightly more elastic and softer than the rigid, brittle capsule walls of Example 7, above.

Preparation D

This preparation was based on the teaching from an example presented in previously-identified United States patent application Ser. No. 701,127, filed on the same day herewith. The untreated capsule product resulting from the procedure of Preparation D above, as is also the case with the other Preparations A, B and C, is not considered to be the subject matter of the present invention. The subject matter of the present invention is the process for nucleation or graft polymerization performed in such a manner that resulting polymeric material is concentrated or localized internally within existing capsule wall material and is also the product of such a process.

Preparation D was concerned with manufacturing capsules having walls comprising poly(vinyl alcohol). The term "poly(vinyl alcohol)" as used herein is to be understood as referring to polymeric material in which at least 50 percent, by weight, thereof is composed of vinyl alcohol constituent. The term refers to polymeric materials, all of which are composed of vinyl alcohol constituents and also to polymeric material containing not only vinyl alcohol constituents but also vinyl acetate (and/or propionate and/or butyrate) constituents providing that the vinyl alcohol constituents make up at least 50 percent, by weight, of the polymeric material. The poly(vinyl alcohol) most often used in practice of this invention is any commercial variety and is the hydrolysis product of poly(vinyl acetate). Poly(vinyl alcohol) representing poly(vinyl acetate) which has been hydrolyzed to an extent of 76 to 99 or more percent, by weight, is preferably used, although poly(vinyl alcohol) having a lower degree of hydrolysis can be used.

Into a vessel having a capacity of approximately 1500 milliliters and equipped for agitation and heating were placed 50 milliliters of water, 20 milliliters of 14 percent, by weight, aqueous acetic acid, 200 milliliters of 11 percent, by weight, aqueous gum arabic solution, 10 grams of urea to serve as an anti-aggregation agent, 20 milliliters of bis(2-methyl-2,4-pentanediol) diborate (2:2), and 150 milliliters of aqueous poly(vinyl alcohol) solution. The poly(vinyl alcohol) solution was prepared as follows: 1.5 grams of about 86,000-molecular weight poly(vinyl alcohol) characterized by having a viscosity of about 28 to about 32 centipoises in a 4 percent, by weight, aqueous solution at 20 degrees centigrade, and by being 99 to 100 percent hydrolyzed (such as the material designated as "Elvanol 71–30" and sold by E. I. du Pont de Nemours and Co., Wilmington, Del., United States of America) and 6 grams of about 125,000-molecular weight poly(vinyl alcohol) characterized by having a viscosity of about 35 to about 45 centipoises in a 4 percent, by weight, aqueous solution at 20 degrees centigrade and by being 87 to 89 percent hydrolyzed (such as the material designated as "Elvanol 50–42" and sold by E. I. du Pont de Nemours and Co., Wilmington, Del., United States of America) were dissolved in enough water to make a total volume of 150 milliliters of solution. The mixture was agitated and heated to a temperature of about 55 degrees centigrade for a few minutes during which time a very viscous liquid phase of poly(vinyl alcohol)/borate complex separated from the manufacturing vehicle. Agitation of the mixture was continued and the system was permitted to cool to a temperature of about 25 degrees centigrade, over a duration of about 30 minutes at the end of which, the liquid-separated phase appeared to be fluid and of a viscosity acceptable for manufacturing capsules. Fifty milliliters of xylene—the capsule internal phase for this example—was added to the system and the agitation was adjusted to yield dispersed particles of capsule internal phase material having diameters of about 100 to 1000 microns. The agitation was continued for about 1.5 hours during which time the separated liquid phase wet and enwrapped the particles to form liquid-walled capsules. Next, in order to shrink and partially dehydrate the liquid capsule walls, 160 milliliters of 7.5 percent, by weight, aqueous sodium sulfate (anhydrous basis) solution was added to the system in a dropwise fashion over a duration of about 40 minutes. A solution of 5 grams of vanadyl sulfate dihydrate in 100 milliliters of 7.5 percent, by weight, aqueous sodium sulfate solution was added over a 20-minute period immediately followed by an amount of concentrated aqueous ammonia solution sufficient to adjust the pH of the system to 4.0 in order to provide conditions for complexing and cross-linking the poly(vinyl alcohol) component of the capsule walls with vanadyl ions. The system of, now solid-walled capsules dispersed in manufacturing vehicle was agitated for an additional 25 minutes and chilled to a temperature of about 10 degrees centigrade. The capsules were separated from the manufacturing vehicle by filtering, were washed several times with cold water, and the capsule walls were dried by placing the capsules in a forced air dryer at a temperature of about 25 degrees centigrade.

Example 9

This example utilized capsules manufactured in Preparation D, above, which capsules had walls of poly(vinyl alcohol) content. The example was designed to demonstrate that the graft polymerization treatment of this invention can be conducted in a non-aqueous vehicle. Ten grams of the dried capsules from Preparation D were dispersed in a solution of 30 milliliters of xylene, 10 milliliters of inhibitor-free acrylonitrile, and 0.25 gram of p-methanehydroperoxide contained in a closed system, under an atmosphere of nitrogen at a temperature of about 25 degrees centigrade. The system was agitated for about 67 hours—care being taken to exclude air from the system at all times—and then 50 milliliters more of xylene was added to the system and the system was permitted to stand for about 24 more hours. The resultant capsules, now with polymeric material grafted within the initially-formed, vanadyl-complexed, capsule wall material, were rinsed with xylene and spread onto an absorbent surface to dry. The above-treated capsules when tested for amount of xylene lost from the capsules in humid conditions (90 percent relative humidity, 38 degrees centigrade) and in warm conditions (60 degrees centigrade), exhibited less weight loss than did capsules from Preparation D, above, left untreated. A desired result in the above test is the demonstration of the loss of very little of the volatile material from the capsules.

Example 10

This example utilized capsules manufactured in Preparation D, above, and was identical with Example 9 with the exception that 10 milliliters of inhibitor-free methacrylonitrile were substituted for the acrylonitrile of Example 9. The treated capsules of this example had more elastic, softer walls than did the treated capsule walls from Example 9. The treated capsules of this example also exhibited less loss of capsule contents than untreated, otherwise identical capsules in the tests described in Example 9.

It should be noted that, in the previous two examples, the graft polymerization reaction was conducted using a manufacturing liquid which was the same kind as the liquid contained by the capsules to be treated. Such is often done, when it is desired and when conditions permit.

What is claimed is:

1. A process for treating capsule walls of hydrophilic polymeric material, en masse, comprising the steps of:
    (a) dispersing the capsules whose walls are to be treated in an agitated aqueous liquid system which system swells the existing capsule wall material and which has, in solution, a non-metallic free-radical initiator material and transition metal ions wherein the transition metal is selected from the group consisting of: copper; chromium; iron; nickel; cobalt; manganese; vanadium; and uranium and which ions infuse into the capsule wall material and are therein bound;
    (b) adding to the agitated system a polymerizable, unsaturated, monomeric, free-radical-polymerizing reactant, which reactant polymerizes catalytically in the presence of transition metal ions in intimate association with the hydrophilic capsule wall material to render the capsule walls hydrophobic.

2. A process for treating existing capsule walls of hydrophilic polymeric material, en masse, comprising the steps of:
    (a) establishing an agitated aqueous liquid system having dispersed therein capsules having liquid-permeated walls of hydrophilic polymeric film-forming material;
    (b) adding to the system, a non-metallic free-radical initiator material and transition metal ion free-radical addition polymerization catalyst wherein the transition metal is selected from the group consisting of: copper; chromium; iron; nickel; cobalt; manganese; vanadium; and uranium and which catalyst is preferentially sorbed into the polymeric film-forming capsule wall material; and
    (c) infusing into the polymeric film-forming material of step (b) a polymerizable, unsaturated, monomeric, free-radial-polymerizing material, whose polymerization is catalyzed by presence of the free-radical addition polymerization catalyst and which polymerization occurs, in the major part, at the sites of catalyst sorption within the capsule wall material, to provide hydrophobic polymeric material capsule walls.

3. A process for treating existing capsule walls of hydrophilic polymeric material, en masse, comprising the steps of:
    (a) establishing an agitated aqueous liquid system having dispersed therein capsules having liquid-permeated walls of hydrophilic polymeric material;
    (b) adding to the system, a non-metallic free-radical initiator material and transition metal ions wherein the transition metal is selected from the group consisting of: copper; chromium; iron; nickel; cobalt; manganese; vanadium; and uranium and which ions are sorbed into and modify the polymeric capsule wall material; and
    (c) infusing into the modified polymeric material produced by step (b) a polymerizable, unsaturated, monomeric free-radical-polymerizing material, whose polymerization is catalyzed by presence of the transition metal ions and which polymerization occurs, in the major part, at the sites of transition metal ions within the capsule wall material to provide rigid hydrophobic capsule walls.

4. A process for treating preformed capsule walls of hydrophilic polymeric material, en masse, comprising the steps of:
  (a) concentrating a transition metal ion free-radical addition polymerization catalyst wherein the transition metal is selected from the group consisting of: copper; chromium; iron; nickel; cobalt; manganese; vanadium; and uranium within liquid-permeated, hydrophilic, capsule wall material of capsules dispersed in an agitated aqueous liquid system;
  (b) adding to the system, a non-metallic free-radical initiator material and a polymerizable, unsaturated, monomeric, free-radical-polymerizing material whose polymerization is catalyzed by presence of the free-radical addition polymerization catalyst and which polymerization occurs within the hydrophilic capsule wall material to provide rigid, hydrophobic, capsule walls.

5. A process for treating existing capsule walls of hydrophilic polymeric material, en masse, comprising the steps of:
  (a) concentrating water-soluble transition metal ions wherein the transition metal is selected from the group consisting of: copper; chromium; iron; nickel; cobalt; manganese; vanadium; and uranium within liquid-permeated, hydrophilic, capsule wall material of capsules dispersed in an agitated aqueous liquid system;
  (b) adding to the system, a non-metallic free-radical initiator material and a polymerizable, unsaturated, monomeric, free-radical-polymerizing material whose polymerization is catalyzed by presence of the transition metal ions and which polymerization occurs within the hydrophilic capsule wall material to provide rigid, hydrophobic capsule walls.

6. In a process for treating existing capsule walls of hydrophilic polymeric material, en masse, comprising the steps of: dispersing the capsules whose walls are to be treated in an agitated aqueous liquid system which system swells the capsule wall material and has, in solution, a first reactant which first reactant infuses into the capsule wall material and is therein bound, and adding to the agitated system a second reactant which reactant reacts with the first reactant to yield a hydrophobic polymeric material in intimate association with the existing capsule wall material to render the capsule walls hydrophobic: the improvement wherein the first reactant is transition metal ions wherein the transition metal is selected from the group consisting of: copper; chromium; iron; nickel; cobalt; manganese; vanadium; and uranium and the second reactant is a polymerizable, unsaturated, monomeric, free-radical-polymerizing material and wherein the aqueous liquid system includes a non-metallic free-radical initiator material, in solution.

7. A process for treating existing capsule walls of hydrophilic polymeric material, en masse, comprising the steps of:
  (a) dispersing capsules having walls of hydrophilic polymeric material, which material has been reacted with transition metal ions wherein the transition metal is selected from the group consisting of: copper; chromium; iron; nickel; cobalt; manganese; vanadium; and uranium in an agitated aqueous liquid system; and
  (b) adding to the agitated system a non-metallic free-radical initiator material and a polymerizable unsaturated, monomeric, free-radical-polymerizing reactant, which reactant polymerizes catalytically in the presence of transition metal ions in intimate association with the existing capsule wall material to render the capsule walls hydrophobic.

8. A process for treating existing capsule walls of hydrophilic polymeric material, en masse, comprising the steps of:
  (a) establishing an agitated aqueous liquid system having dispersed therein capsules having liquid-permeated walls of hydrophilic polymeric material;
  (b) adding to the system, a non-metallic free-radical initiator material and transition metal ions wherein the transition metal is selected from the group consisting of: copper; chromium; iron; nickel; cobalt; manganese; vanadium; and uranium and which ions are sorbed into and modify the polymeric capsule wall material; and
  (c) infusing into the modified polymeric material produced by step (b) a polymerizable, unsaturated, monomeric, free-radical-polymerizing material selected from the group consisting of: acrylonitrile; methacrylonitrile; fumaronitrile; and itacononitrile, whose polymerization is catalyzed by presence of the transition metal ions and which polymerization occurs, in major part, at the sites of transition metal ions within the capsule wall material to provide rigid hydrophobic capsule walls.

9. A process for treating existing capsule walls of hydrophilic polymeric material, en masse, comprising the steps of:
  (a) concentrating water-soluble transition metal ions wherein the transition metal is selected from the group consisting of: copper; chromium; iron; nickel; cobalt; manganese; vanadium; and uranium within liquid-permeated, hydrophilic, capsule wall material of capsules dispersed in an agitated aqueous liquid system;
  (b) adding to the system, a non-metallic free-radical initiator material and a polymerizable, unsaturated, monomeric, free-radical-polymerizing material selected from the group consisting of: acrylonitrile; methacrylonitrile; fumaronitrile; and itacononitrile whose polymerization is catalyzed by presence of the transition metal ions and which polymerization occurs within the hydrophilic capsule wall material to provide rigid, hydrophobic capsule walls.

References Cited

UNITED STATES PATENTS

| | | | |
|---|---|---|---|
| 3,405,071 | 10/1968 | Reyes | 252—316 |
| 2,800,457 | 7/1957 | Green et al. | 252—316 |
| 3,080,318 | 3/1963 | Claus | 117—100 X |
| 3,138,478 | 6/1964 | Hedman et al. | 117—100 X |
| 3,291,611 | 12/1966 | Krajewski | 424—37 X |

RICHARD D. LOVERING, Primary Examiner

US. Cl. X.R.

71—64 F; 99—166; 106—308 Q; 117—62.2, 100 A, 100 B; 252—182; 264—4; 424—32, 33, 34, 37